US008376846B1

(12) United States Patent
DiMichele et al.

(10) Patent No.: US 8,376,846 B1
(45) Date of Patent: *Feb. 19, 2013

(54) KIOSK SYSTEM AND METHOD FOR A GAMING MACHINE

(75) Inventors: Carmen DiMichele, Sparks, NV (US); James W. Morrow, Sparks, NV (US); Michael M. LeStrange, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1482 days.

This patent is subject to a terminal disclaimer.

(21) Appl. No.: 11/404,310

(22) Filed: Apr. 14, 2006

Related U.S. Application Data

(63) Continuation-in-part of application No. 10/943,771, filed on Sep. 16, 2004, now Pat. No. 7,950,999, and a continuation-in-part of application No. 11/140,239, filed on May 26, 2005, and a continuation-in-part of application No. 11/307,528, filed on Feb. 10, 2006, now Pat. No. 7,905,780.

(51) Int. Cl.
*A63F 13/00* (2006.01)

(52) U.S. Cl. ................. 463/31; 463/16; 463/30; 463/42

(58) Field of Classification Search .................... 463/16, 463/20, 25, 30–33, 40–42
See application file for complete search history.

(56) References Cited

U.S. PATENT DOCUMENTS

| | | | |
|---|---|---|---|
| 6,722,986 | B1 | 4/2004 | Lyons et al. |
| 2004/0100490 | A1 | 5/2004 | Boston et al. |

OTHER PUBLICATIONS

Hong-Taek Ju; Mi-Jung Choi; Sehee Han; Yunjung Oh; Jeong-Hyuk Yoon; Hyojin Lee; Hong, J.W., “An embedded Web server architecture for XML-based network management,” Network Operations and Management Symposium, 2002. NOMS 2002. 2002 IEEE/ILIP , vol., No., pp. 5-18, 2002 http://citeseerx.ist.psu.edu/viewdoc/download?doi=10.1.1.107.7189&rep=rep1&type=p.*

Advertisement in Gaming Products & Services/Bingo Manager Magazine, Table of Contents, vol. 5, No. 7, Jul. 1997.

* cited by examiner

*Primary Examiner* — Ronald Laneau
*Assistant Examiner* — Ross Williams
(74) *Attorney, Agent, or Firm* — David Caracappa

(57) ABSTRACT

An embedded additional user interface configured as a kiosk for use in a gaming machine includes a multimedia display screen, wherein the display screen presents kiosk functionality data to a user via the display screen. A network connection connects the embedded additional user interface to a gaming network. An embedded processor employs an internal operating system and communicates with one or more kiosk data servers through the gaming network. The embedded processor reads incoming kiosk data, and maps the data to the multimedia display screen. The embedded processor further sends input kiosk data received from a user to the one or more kiosk data servers through the gaming network. In one embodiment, the gaming network connects to a wide area network for connection to the one or more kiosk data servers.

30 Claims, 11 Drawing Sheets

KIOSK SYSTEM AND METHOD FOR A GAMING MACHINE

CROSS REFERENCE TO RELATED DOCUMENTS

This application is a continuation-in-part of U.S. patent application Ser. No. 10/943,771 filed Sep. 16, 2004 now U.S. Pat. No. 7,950,999; U.S. patent application Ser. No. 11/140,239 filed May 26, 2005; and U.S. patent application Ser. No. 11/307,528 filed Feb. 10, 2006 now U.S. Pat. No. 7,905,780, which are hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a gaming system that incorporates a kiosk, and more particularly, to a system and methodology that integrates a kiosk having display screen into a gaming machine to provide kiosk functionality to players.

BACKGROUND OF THE INVENTION

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. By attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Separately, in many casino and non-casino settings, standalone kiosks have been employed to perform specific functions. For example, lottery ticket kiosks have become commonplace in commercial establishments in States that participate in intrastate and interstate lotteries. Both consumer and merchant usable lottery kiosks allow for purchase of lottery tickets and "scratch-off" games. Kiosks have also been used to serve as stand-alone automated teller machines (ATMs) where users can view account information, transfer funds, take out cash, and make deposits. In grocery stores, electronic coupons are available from in-store kiosks. Kiosks are also used in airports to purchase airline tickets, and automated check-in.

It would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the breath and quality of information available to maintain the player's attention and keep him engaged at the game for longer periods of time.

As stated above, attempts to distribute gambling-related information, advertisements and news of general interest to players, has typically required additional system components to be attached to the gaming devices separately and apart from the construction of the gaming machine itself. Such components have generally included a keypad, card reader, and display equipment, such as a 2-line LED display. Specifically, these components for accessing and displaying information from gaming machines have been extremely limited in their usefulness because of the lack of capabilities Inherent in these components. In addition there is necessarily a limited space available in a gaming machine into which these components can be mounted. This serves to further limit their effectiveness. It would be desirable for new components capable of handling this expanded information transfer to be integrated into the gaming device itself. This would provide for a shareable mechanism with substantially greater functionality and extensibility than that which has been previously available.

Accordingly, those skilled in the art have long recognized the need for a system that is capable of integrating expanded service and systems capabilities of one or more kiosks with the more traditional function of a gaming device. The claimed invention clearly addresses these and other needs.

SUMMARY OF THE INVENTION

Briefly, and in general terms, the claimed invention resolves the above and other problems by providing an embedded additional user interface configured as a kiosk for use in a gaming machine. More particularly, an embedded kiosk is incorporated into a gaming machine cabinet. The gaming machine includes a gaming presentation and gaming processor. The embedded additional user interface includes a web content capable display screen, wherein the display screen presents web information to a user via the display screen. An embedded processor is included that employs an internal operating system. The embedded processor reads incoming kiosk data from one or more kiosk servers connected to a gaming network, translates the data into a web protocol, if necessary, and maps the data to the web content capable display screen. The web content capable display provides kiosk operations in addition to a gaming experience.

In accordance with another aspect of a preferred embodiment, the kiosk operations include, by way of example, and not by way of limitation, using player account enrollment and rewards services, viewing of casino player account standings, viewing of account status and history, redeeming of payout tickets, redeeming of promotional or complimentary awards, requesting help or service from an attendant, ordering drinks, making dinner reservations, reserving taxis, purchasing show tickets, conducting banking transactions, buying lottery tickets, providing coin-in, coin-out information, displaying malfunction conditions, displaying jackpots, displaying tilt conditions, displaying a game software version, conducting bank account maintenance, ordering products, redeeming coupons, making hotel reservations, or making electronic funds transfers.

The display screen of the embedded additional user interface is preferably a color graphic touch screen display. Preferably, the embedded processor is at least a 32-bit processor. Further, the internal operating system of the embedded additional user interface is preferably customized to match the specific hardware to which the internal operating system attaches.

In accordance with another aspect of a preferred embodiment, the embedded processor utilizes cryptographic technology. In one preferred embodiment, a certification process is provided for authentication and non-repudiation of the kiosk data. Preferably, the certification process provides audit-ability and traceability. Specifically, the certification process provides sufficient security for kiosk server operators to design their own content.

In accordance with another aspect of a preferred embodiment, the kiosk data uses web protocol. In another preferred embodiment, HTML is the web protocol. In another preferred embodiment, the web protocol is JAVASCRIPT®. In still another preferred embodiment, XML is the web protocol. In yet another preferred embodiment, MACROMEDIA FLASH® animation technology is the web protocol. In one preferred embodiment, the embedded additional user interface connects to an Ethernet-networked backbone. Further, in one preferred embodiment, the kiosk connects to a web server through an Ethernet-networked backbone.

In another preferred embodiment, the embedded additional user interface includes an animation capable display screen and an embedded processor. In yet another preferred embodiment, the kiosk includes a web page display screen and an embedded processor. In still another preferred embodiment, the kiosk includes a multimedia display screen and an embedded processor.

In accordance with another preferred embodiment, the claimed invention is directed towards a gaming machine that includes an embedded kiosk having a display screen. Preferably, the gaming machine includes a gaming display screen, a gaming processor, and an embedded additional user interface. The embedded additional user interface further includes a display screen and an embedded processor that has been described above.

In accordance with another preferred embodiment, the claimed invention is directed towards a method for providing kiosk operations in a gaming machine via an additional user interface that is incorporated into the gaming machine cabinet, wherein the additional user interface includes an additional processor and a web page display screen. The method includes receiving a data message containing kiosk data through a communication bus in the additional user interface; translating the data message into a web authoring language, if necessary; and mapping the data message to the web page display screen, wherein the display screen presents kiosk data to a user via the display screen.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENTS

A preferred embodiment of the embedded additional user interface, constructed in accordance with the claimed invention, is directed towards the integration of an embedded additional user interface into a gaming machine to increase user excitement by providing a richer gaming experience. The embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments of the invention.

Figure 1:
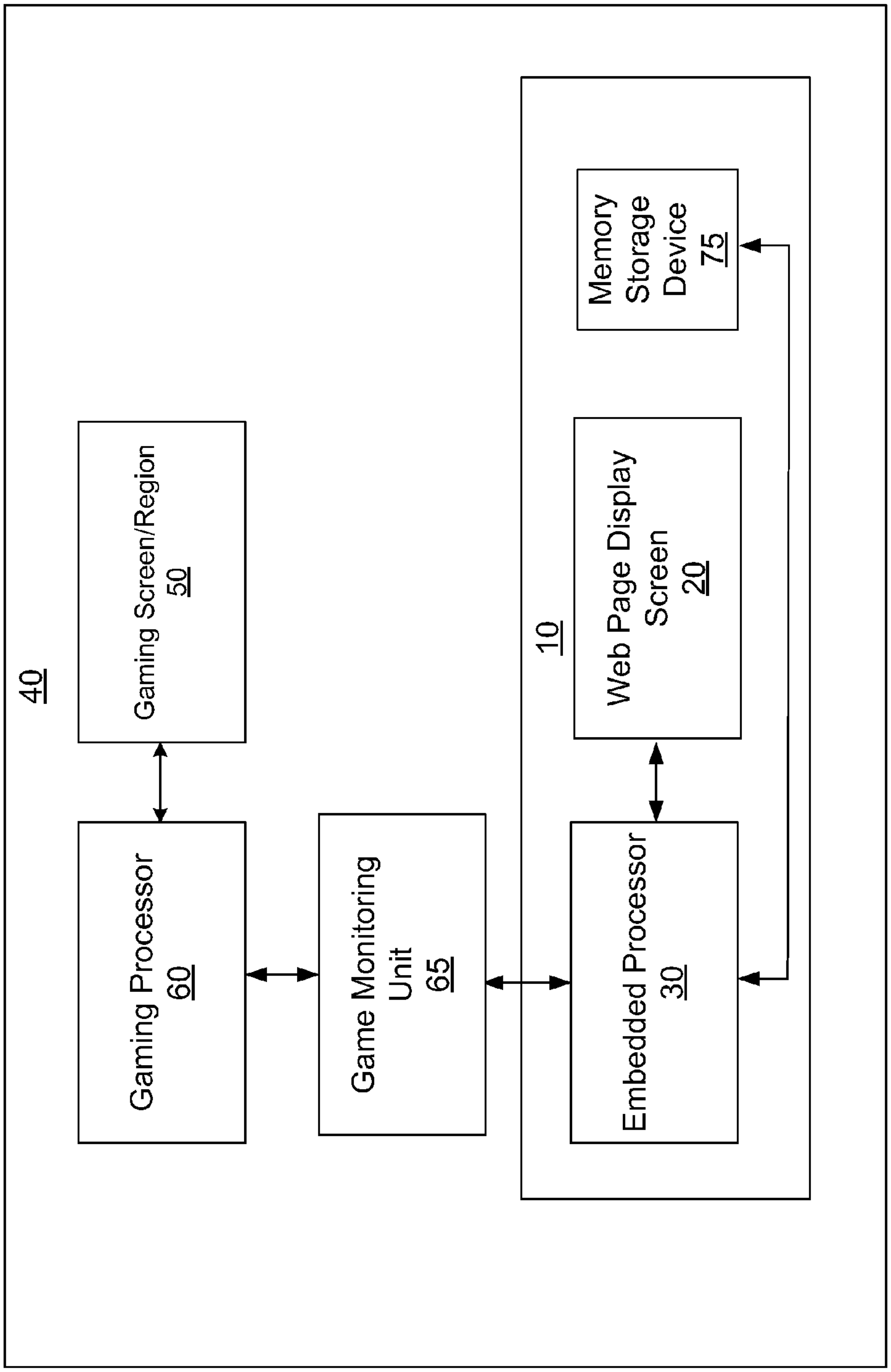
FIG. 1 illustrates a relational diagram of an embedded additional user interface, constructed in accordance with the claimed invention, utilizing a web page display screen and an embedded processor that receives data messages from a game monitoring unit that are translated into web page content and mapped to the web page display screen.

Referring now to the drawings, wherein like reference numerals denote like or corresponding parts throughout the drawings and, more particularly to FIGS. 1-5, there is shown one embodiment of an embedded additional user interface 10. Specifically, FIG. 1 shows an embedded additional user interface 10 that includes a web page display screen 20 and an embedded processor 30. The user interface 10 is incorporated into a gaming machine 40 that, in turn, includes a gaming screen 50, (and/or non-screen gaming region 50, e.g., spinning reels or other gaming presentation) gaming processor 60, and a game monitoring unit 65. The embedded processor 30 employs an internal operating system and communicates with the gaming processor 60, preferably via the game monitoring unit 65. The embedded processor 30 reads incoming data, translates the data into a web authoring language, and maps the data to the web page display screen 20. The display screen 20 presents web page information to a user via the display screen, thereby increasing user excitement by providing a richer gaming experience. The game monitoring unit 65 monitors the information that is input through the user interface 10. This provides a dramatic improvement over traditional system components 70 that have been used as in the past to provide user information. The user interface 10 communicates with the game monitoring unit 65 in the same manner as the previous system components 70 communicated with the game monitoring unit.

Figure 2:
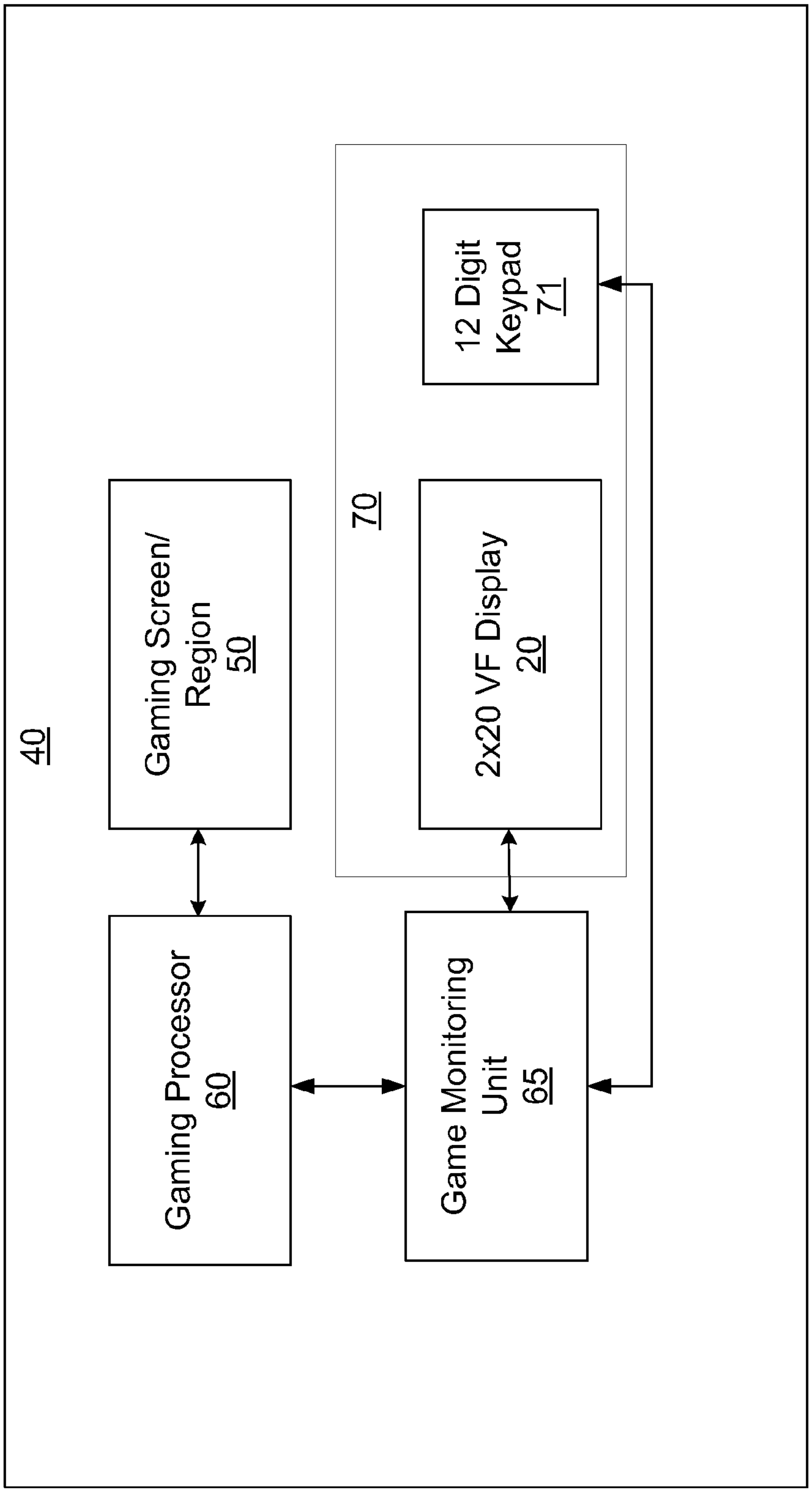
Fig. 2 (Prior Art)
FIG. 2 illustrates a relational diagram of a prior art gaming system that utilizes a 2×20 VF display and 12-digit keypad.

As shown in FIG. 2, prior art gaming devices typically utilized a single video display screen as a gaming screen 50 for the gaming machine 40, while additional system components 70 were attached or juxtaposed next to the gaming machine. The display may comprise, for example, a 2-line, 20 character VF (Vacuum Fluorescent) display 20. An input device may comprise a 12-digit keypad 71.

However, referring again to FIG. 1, in a preferred embodiment of the claimed invention, the system components 70 that were used in prior art systems are replaced with the embedded additional user interface 10 to provide the advanced functionality of a web page display screen 20. Such functionality includes, by way of example only, and not by way of limitation, the ability to display animation, multimedia, and other web-type content. The embedded additional user interface 10 enables presentation of additional information (e.g., enhanced player information) to a player (or potential player) through the web page display screen 20 in an exciting, eye-catching format, while not interfering with the normal gaming processes being displayed on the gaming screen 50. Further, the embedded additional user interface 10 does not interfere with the normal gaming hardware in the gaming machine 40, but rather is easily integrated into a gaming machine 40.

In situations involving multiple gaming machine (or gaming component) manufacturers, an embedded additional user interface 10 can be incorporated into a gaming machine (either originally or by retrofitting) without requiring access to the game logic or other gaming systems that might be proprietary and inaccessible with a gaming machine from another gaming manufacturer. Thus, in a preferred embodiment of the claimed invention, the embedded additional user interface 10, which includes a web page display screen 20 for presenting supplementary information to a player, is incorporated into a gaming machine 40 in addition to the standard gaming screen 50 typically found in a gaming machine. The embedded additional user interface 10 may also be incorporated into a gaming machine 40 that utilizes a gaming region (e.g., a reel-spinner) instead of a standard gaming screen 50. This supplemental information may include general gaming information, player specific information, player excitement and interest captivation content, advertising content (targeted or otherwise), and the like. Further, in other preferred embodiments, the embedded additional user interface 10 may have the ability to interact with the game logic of the gaming processor 60, preferably via the game monitoring unit 65, and thus, provide further functionality, such as bonus games, system games, and/or the ability to incorporate awards, promotional offers, or gifts from the web page display screen 20 to the gaming screen 50. Moreover, the web page display screen 20 may display supplemental information in an "attract mode" when there is no game play occurring. Also the gaming processor 60 may use the web page display screen 20 to present casino employees with a web based dialogue to facilitate gaming machine configuration and event investigation activities without disturbing the gaming screen/region 50.

In a preferred embodiment of the claimed invention, the embedded additional user interface 10 is used to make casino services more accessible and friendly to casino patrons. In one preferred embodiment, the embedded additional user interface 10 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI (Enhanced Player Interface), which uses an industry standard $I^2C$ bus and signaling. Other gaming systems use an RS232 bus and signaling.

In one preferred embodiment, the embedded additional user interface 10 is used to replace/upgrade an EPI. Preferably, the embedded additional user interface 10 replaces the EPI of the gaming machine in a "plug and play" manner. In other words, the old EPI can be unplugged and the new embedded additional user interface 10 can simply be plugged into the $I^2C$ bus of the game monitoring unit 65 in the gamming machine 40. The user interface 10 utilizes the currently employed industry standard $I^2C$ bus and signaling without requiring any further modification. The embedded processor 30 of the embedded additional user interface 10 reads incoming $I^2C$ data (content), translates the data into a web authoring language (e.g., HTML, DHTML, XML, MACROMEDIA FLASH), and maps the data to the web page display screen 20. In this manner, the previous $I^2C$ data messages, which were typically presented on a 2-line, 20 character VF display, are automatically transformed by the embedded additional user interface 10 into an attention grabbing, animated (multimedia) web page style format. This results in enhanced player satisfaction and excitement with extremely minimal retrofitting requirements. In one preferred embodiment, a physical layer and transport layer use customer message layer signaling to transform the $I^2C$ messages.

Since, in one preferred embodiment, the embedded additional user interface 10 utilizes $I^2C$ hardware and signaling, this enables the user interface 10 to speak and understand the $I^2C$ protocol message set, and thus, communicate with the GMU 65, which communicates with the gaming processor 60 of the gaming machine 40 (or other similarly networked devices) in the same fashion in which the gaming processor previously communicated over an EPI or RS232 bus. Accordingly, in a preferred embodiment of the claimed invention, the functionality of the previously utilized hardware (e.g., the EPI) can be replaced or augmented and thus substantially upgraded with the integration of the embedded additional user interface 10 into the gaming machine 40. As such, the limitations placed upon the gaming processor 50 by the low function external hardware of such system components 70 (e.g., a keypad and a 2-line, 20 character VF display) may be eliminated.

As stated above, in one preferred embodiment, the incoming data received by the embedded additional user interface 10 is $I^2C$ signaling protocol; however, in other preferred embodiments other serial communication protocols (or electronic communication format) may be utilized. Preferably, the embedded processor 30 communicates with the gaming processor 60 via the game monitoring unit 65, and/or other connected devices, over an $I^2C$ bus (or over another serial communications bus in embodiments that utilize another protocol). The web page display screen 20 of the embedded additional user interface 10 is preferably a color-graphic touch screen display. Preferably, the embedded processor 30 is at least a 32-bit processor. A preferred embodiment utilizes a 32-bit processor because cryptographic techniques, such as SHA-1 (or better) and DSA algorithms, are written and operate natively on a 32-bit system. Additionally, the Microsoft® Windows® environment, which is utilized in some preferred embodiments of the claimed invention, is also 32-bit. Further, the internal operating system of the embedded additional user interface 10 may be adapted or customized to match the specific communication bus hardware used by the devices in the gaming machine 40 to which the internal operating system communicates.

Preferably, the embedded additional user interface 10 is an embedded computer board that, in addition to the embedded processor 30 and the web page display screen 20, further includes a removable COMPACT FLASH card 75 (or other memory storage device), as shown in FIG. 1, and a network adapter port. Content and feature updates to the embedded additional user interface 10 are accomplished by physically swapping out the COMPACT FLASH card 75 (or other memory storage device). Thus, in order to retrieve data from the embedded additional user interface 10, the data is accessed by physically removing and reading the COMPACT FLASH card 75. In other embodiments, as described below, updates may be provided by direct or peer-to-peer downloading over a network.

In one preferred embodiment, the internal operating system utilized by the embedded processor 30 of the embedded additional user interface 10 is WINDOWS® CE version 4.2 (or higher). Preferably, the embedded additional user interface 10 is built upon a PXA255-based board developed by the Kontron Corporation. Additionally, in a preferred embodiment of the embedded additional user interface 10, the browser control for the web page display screen 20 is MICROSOFT® INTERNET EXPLORER® 6.0 (or higher), which is shipped standard with WINDOWS® CE 4.2, the preferred internal operating system for the embedded processor 30.

A preferred embodiment of the embedded additional user interface 10 also provides a mechanism for inputting system information into, and retrieving system information from, the game machine 40. As stated above, the embedded additional user interface 10 preferably uses industry standard $I^2C$ hardware and signaling. The $I^2C$ protocol has multi-master capabilities. For example, and not by way of limitation, each $I^2C$ device is capable of participating as both a slave and as a master. The embedded additional user interface 10 enables system information (such as information input by a player into a web page display screen 20) to be sent from the game machine 40 to a slot system network (or to another destination location). Likewise, the embedded additional user interface 10 also enables the system information (such as display messages) to be sent from the systems network (or from another source location) to the game machine 40 for viewing by the player through the web page display screen 20.

In a preferred embodiment, information can also be input by a user into the web page display screen 20 of the user interface 10. The web page display screen 20 of the user interface 10 employs a virtual keypad. Further, the user interface 10 uses a keypad dictionary that allows a user to be able to enter a vastly greater amount of information than was previously possible using a 12 digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 40 within a particular casino. By utilizing the embedded additional user interface 10 of the claimed invention, the gaming network interface can be instructed to move funds between player's accounts and gaming devices by merely touching the web page display screen 20. In addition, many other more sophisticated commands and instructions may be provided. Thus, the embedded additional user interface 10 improves the player and casino employee interface to the gaming machine 40, directly at the gaming device itself.

In a preferred embodiment of the claimed invention, the web page display screen 20 of the embedded additional user interface 10 enables a player to be shown player messages in an animated, multimedia, web content style environment. These messages would previously have been displayed in a significantly more mundane format on a separate display device (e.g., a 2-line VF display device). In some preferred embodiments, touch screen buttons in the web page display screen 20 are used by the player to navigate between windows in web page display screen 20 and allow access to system functions such as cashless withdraw, balance requests, system requests, points redemption, and the like. In other preferred embodiments of the claimed invention, the web page display screen 20 utilizes various other data input techniques commonly known in the art, instead of the touch screen data entry. Thus, implementation of the embedded additional user interface 10 is an efficient, highly beneficial, and substantial upgrade to a gaming machine 40 that greatly increases the functionality over what was previously possible using an EPI.

In one preferred embodiment, text data messages are translated into web page navigation requests by the embedded processor 30 and then displayed on the web page display screen 20 as shown and discussed with respect to FIGS. 6A and 6B below. Script languages, such as JAVA SCRIPT and VB SCRIPT, are also utilized for some of the web pages. Preferably, the embedded additional user interface 10 emulates the 12-digit keypad and the 2×20 VF display on the web page display screen 20, which has touch screen capabilities. In this embodiment, commands that were previously displayed on the 2×20 VF display are matched to a corresponding URL and a browser is used to render the page on the web page display screen 20. The web pages displayed contain touch-screen keys that effectively emulate hardware keys.

Figure 6A:
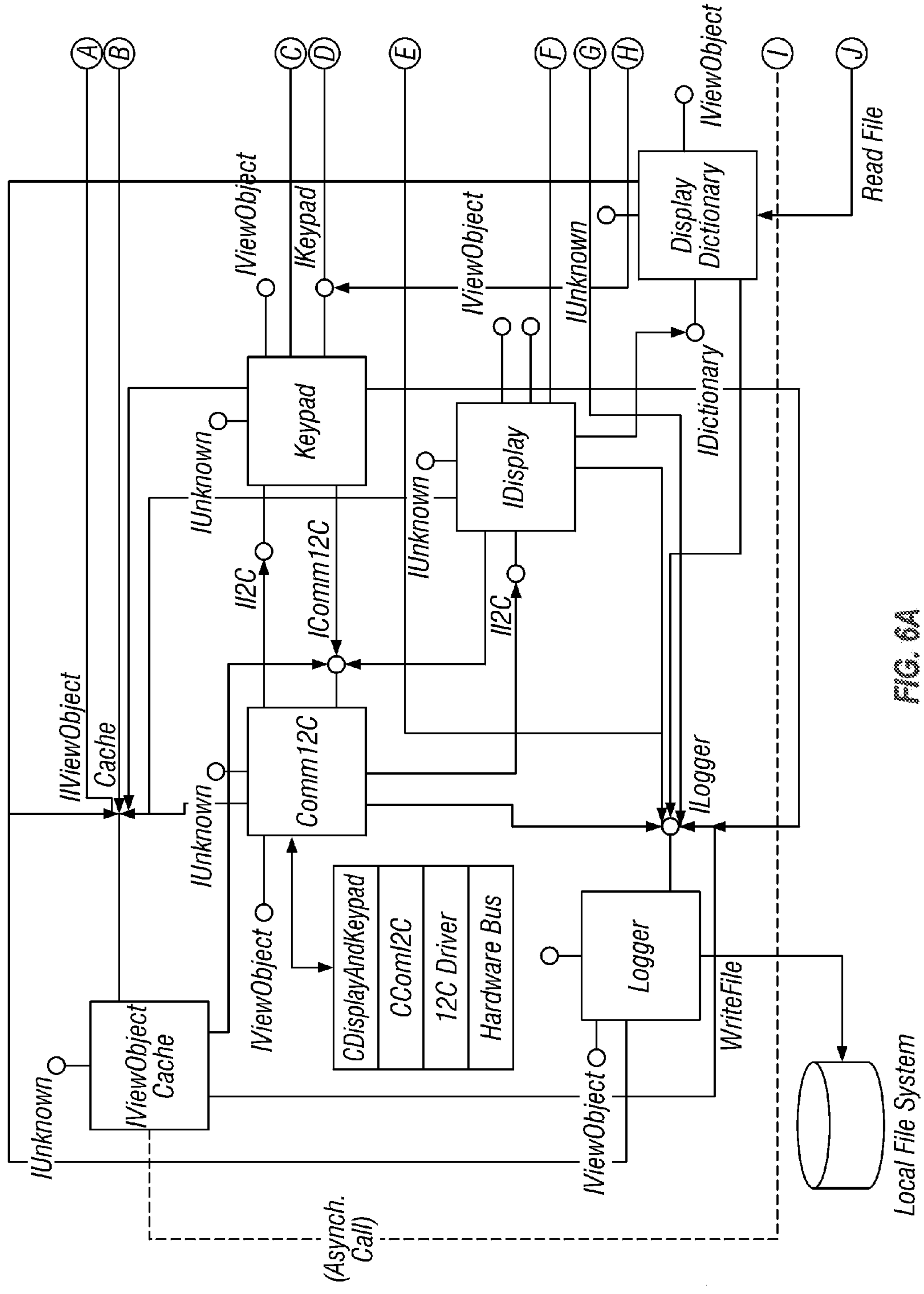
FIGS. 6A and 6B are each partial views of a diagram that illustrates an object interaction diagram of embedded additional user interface, constructed in accordance with the claimed invention.
Figure 6B:
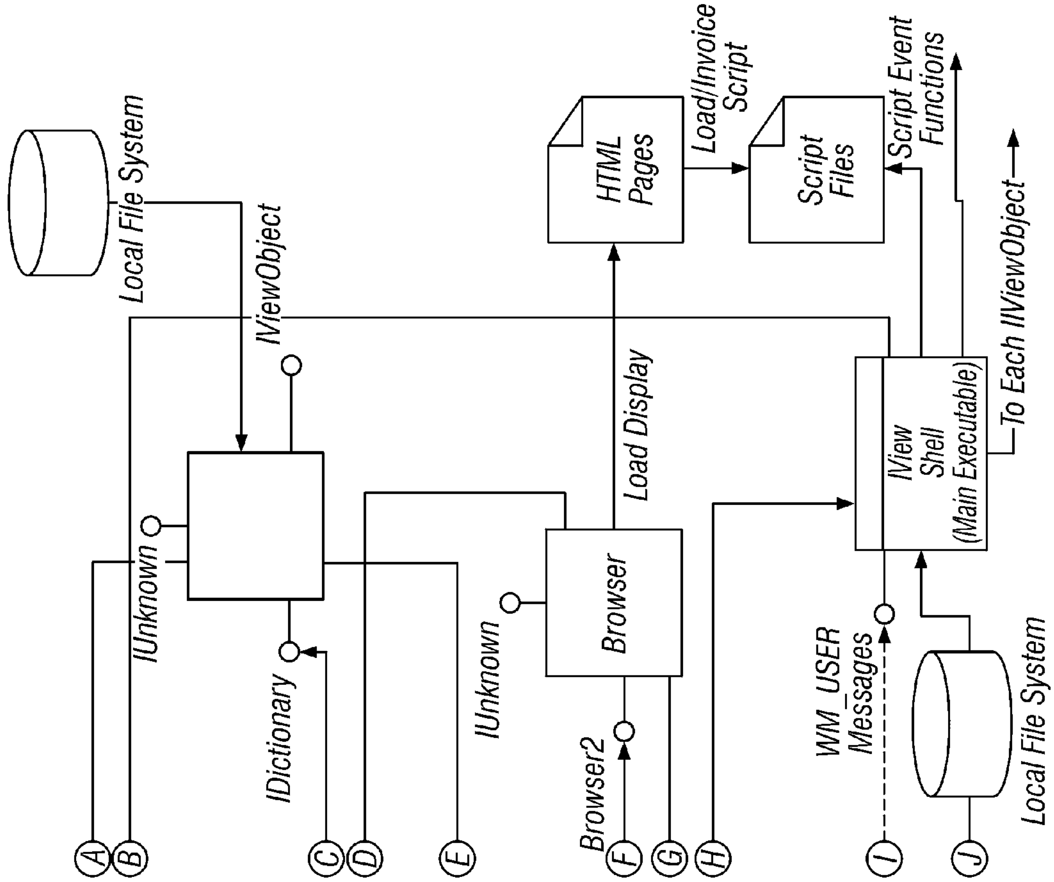
Figure 7:
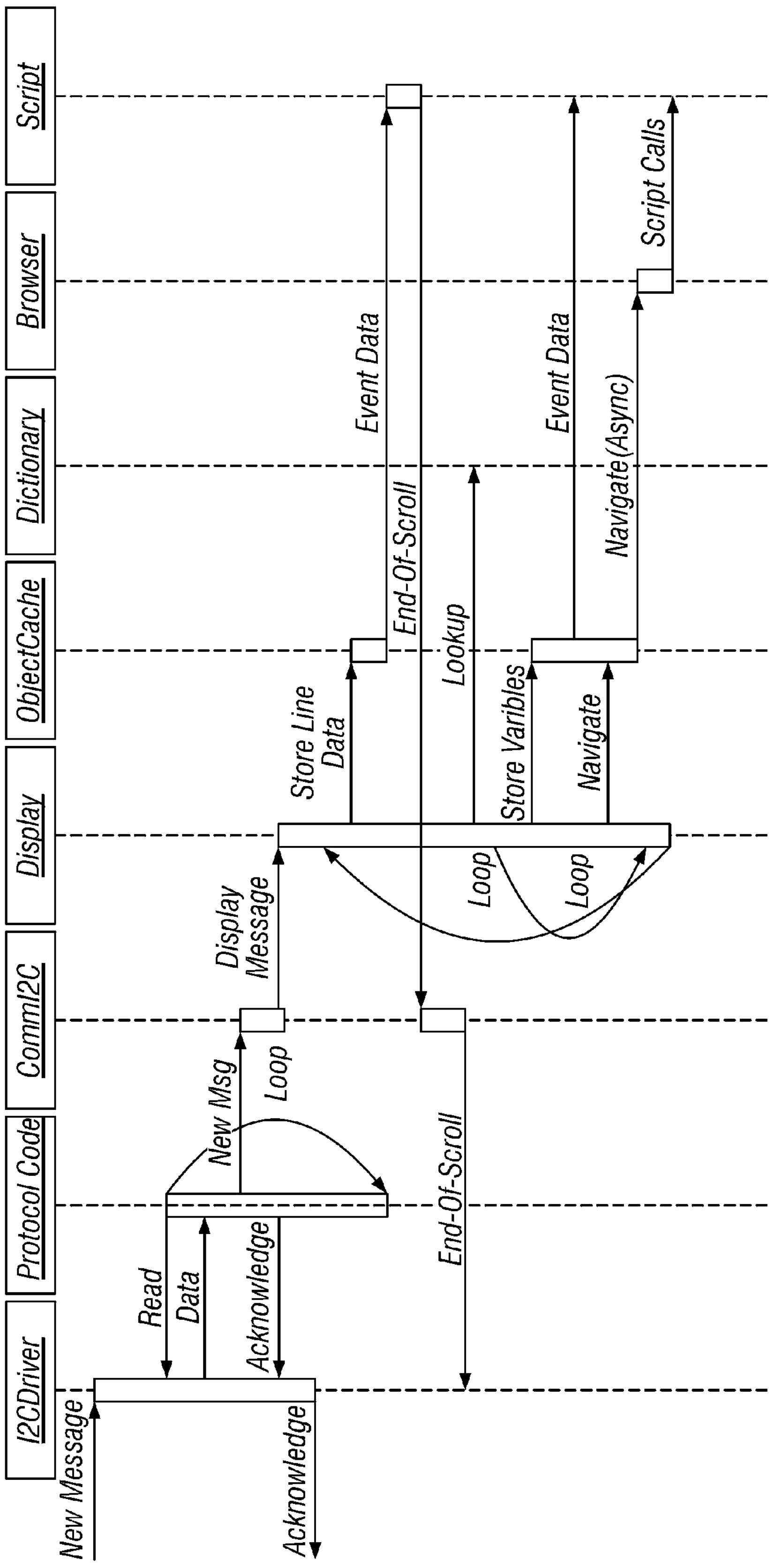
FIG. 7 is a diagram showing the sequence of events that occur when data is sent between the embedded additional user interface and the game monitoring unit.

With reference to FIGS. 6A and 6B, in one preferred embodiment of the claimed invention, a dictionary URL approach is used for translating the data messages into web page information. In this manner, data messages are "looked up" in a dictionary data file where they can be redirected to an attractive URL. The embedded processor 30 responds to requests on the $I^2C$ bus that were intended for the prior art enhanced player interface (EPI) VF display. The web page display screen 20 is not a passive display device like traditional PC monitors, but rather the display screen 20 must respond to commands with text type responses. These requests include initialization requests, status requests, and display requests. With reference to FIG. 7, as each text data message to be displayed is passed into the embedded processor 30, the processor 30 calls a URL Dictionary to look up a URL with which to replace the text data message. Once the substitution is complete, the embedded processor 30 instructs the web page display screen 20 to present (or navigate to) the appropriate web page.

Figure 8:
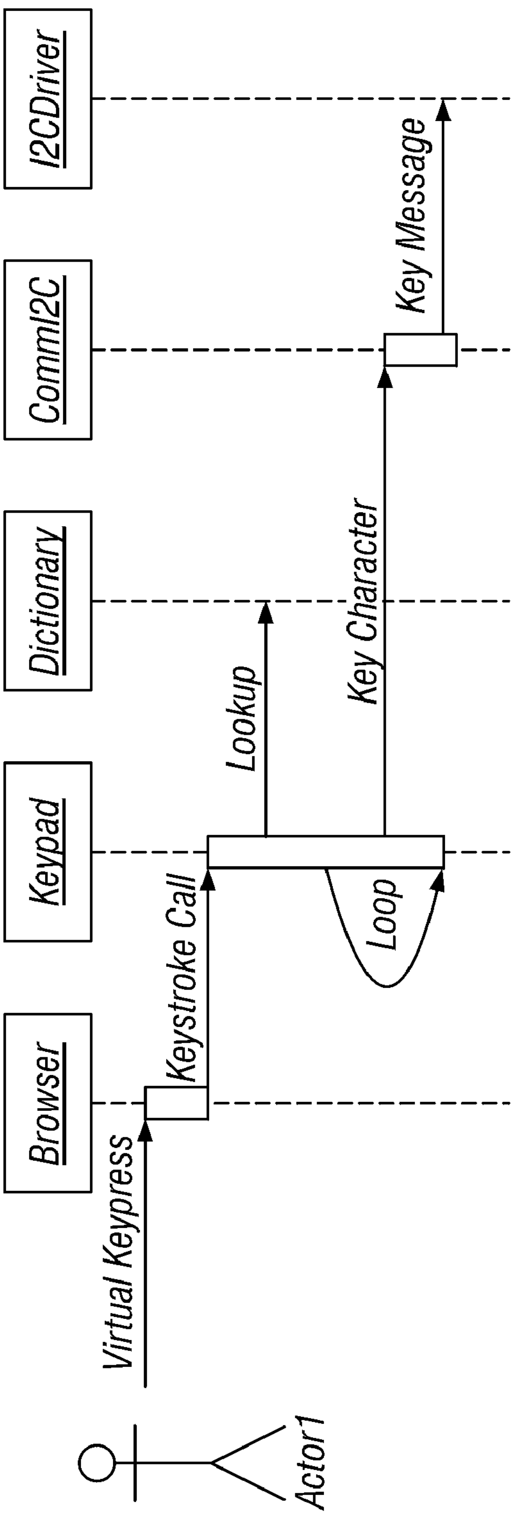
FIG. 8 is a diagram showing the sequence of events that occur when a virtual key is pressed on the web page display screen.

Accordingly, with reference to FIG. 8, a URL Dictionary component is used to map a text string, sent from the embedded processor 30 and intended for the display on the 2×20 VF display, to a URL that can be used to display a much more visually enhanced graphical representation of the same message. Thus, the URL Dictionary component contains a listing of the possible text messages to be supported that could be sent from the embedded processor 30, and a mapping to a set of the desired eye-catching, web content to be displayed on the web page display screen 20. In this event that a message is not in the URL Dictionary, such a message is mapping to a page that substitutes for the 2-line mode.

In the preferred embodiments described above, the embedded processor 30 of the embedded additional user interface 10 reads incoming $I^2C$ data messages, translates the $I^2C$ data messages into a web authoring language (e.g., HTML, DHTML, XML, MACROMEDIA FLASH), and maps the newly translated web page data message to the web page display screen 20. Additionally, the embedded additional user interface 10 can also read incoming data messages that are already in a web authoring language (e.g., HTML, DHTML, XML, MACROMEDIA FLASH), and map this web page data to the web page display screen 20. Further, and highly advantageously, a preferred embodiment of the claimed invention also allows casinos that are using the embedded additional user interface 10 to design and use their own content, thereby giving the casinos the ability to decide what the web page presented on the web page display screen 20 of the user interface 10 will look like.

Figure 3:
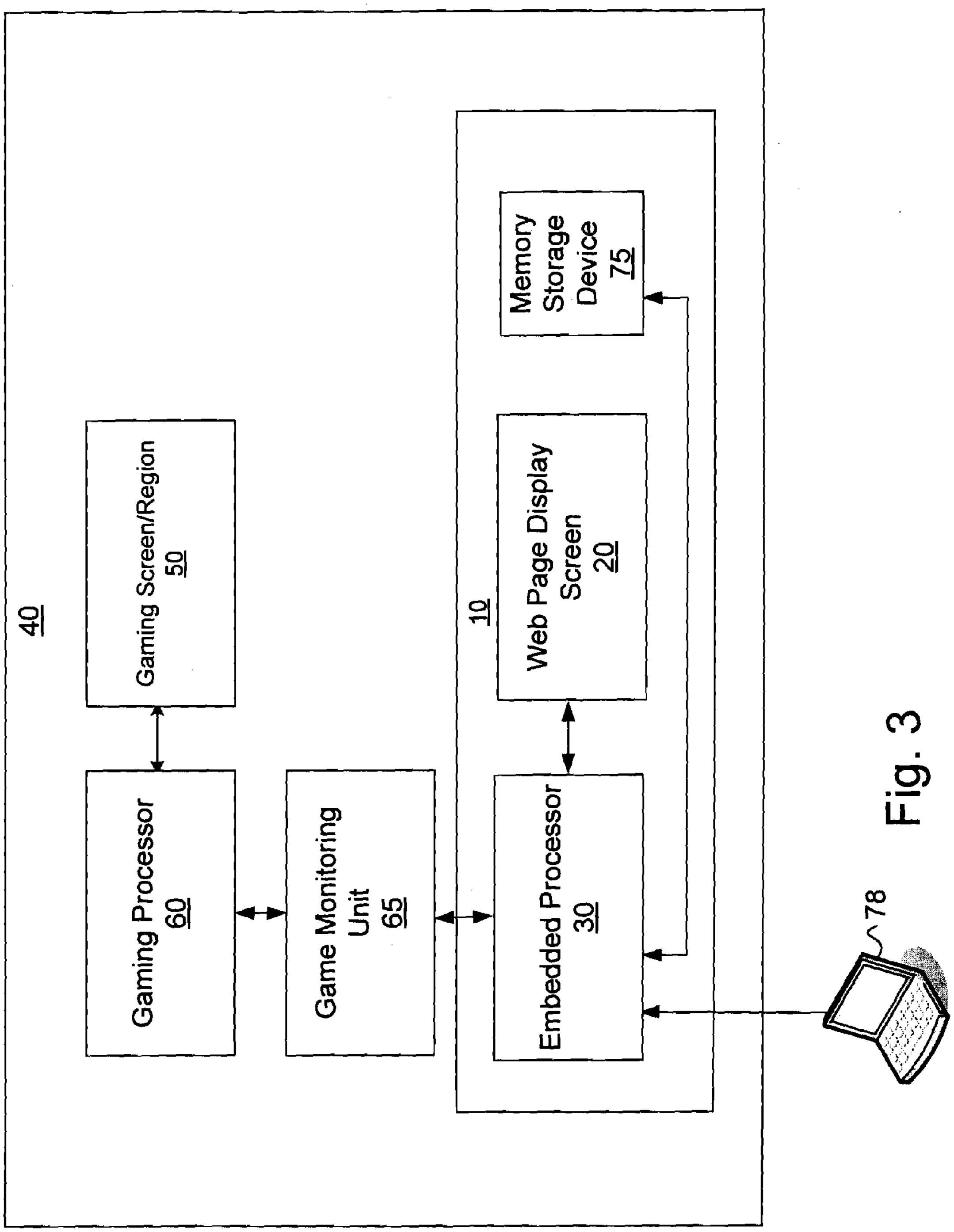
FIG. 3 illustrates a relational diagram of embedded additional user interface, constructed in accordance with the claimed invention, utilizing a web page display screen and an embedded processor that receives cryptographically certified web page content from a portable computer via a network adapter port.

Referring now to FIG. 3, in this preferred embodiment, content may be locally downloaded. Specifically, in one preferred embodiment, the content is updated through a physical USB (or other connection) that is used to download the new content. In one preferred embodiment, the data on the COMPACT FLASH card 75 can be accessed by connecting a separate computer 78 to the network adapter port of the embedded additional user interface 10. This embodiment allows updating the contents of the operating system, changing the operating system itself, and receiving data from the Compact Flash card 75. Physical removal of the COMPACT FLASH card 75 is also still be an option for update and inspection of files on the embedded additional user interface 10.

In one preferred embodiment, a portable computer is used to store and publish data content to the COMPACT FLASH card 75 on the embedded additional user interface 10, as well as to receiving data from the COMPACT FLASH card 75 on the embedded additional user interface. In this embodiment, all content on the embedded additional user interface 10 is authenticated as if it were a gaming machine.

In another preferred embodiment, a network adapter port is provided on the embedded computer board of the user interface 10. This embodiment also includes a boot loader. Further, in this embodiment, the portable computer 78 (described above) includes components for use in uploading data to, and downloading data from, the COMPACT FLASH card 75 on the embedded additional user interface 10. Specifically, the components that run on the portable computer 78 are for moving new data content to the embedded additional user interface 10, and for validation and verification of the data content that is on the embedded additional user interface. Preferably, all data that is used to update the COMPACT FLASH card 75 moves to or from the embedded additional user interface 10 over the single built in network adapter port on the board.

Prior to the advent of the embedded additional user interface 10 of the claimed invention, gaming regulators would have been unwilling to allow casino operators to design their own content. However, due to the cryptographic technology implemented by the embedded processor 30 in the embedded additional user interface 10, a certification process is provided by the claimed invention with sufficient security for gaming regulators to allow casino operators to design their own content. Specifically, in one preferred embodiment, the certification process offered ensures authentication and non-repudiation of the casino operator designed web content. Preferably, in the claimed invention the certification process provided further ensures auditability and traceability. Various cryptographic technologies, such as authentication and non-repudiation (described herein below), are utilized in preferred embodiments of the claimed invention, to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a x509 certificate) that allow for limited access. Thus, this preferred embodiment allows the attributes within the certificate to be used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number. In other preferred embodiments, higher level Secure Hash Functions are used, such as SHA-256 or SHA-512.

In another preferred embodiment, the claimed invention utilizes a Message Authentication Code (MAC). A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical the use of a Message Authentication Code provides an advantage, because it can be created and stored more rapidly than digital signature verification technology.

In one preferred embodiment, the authentication technique utilized is a BKEY (electronic key) device. A BKEY is an electronic identifier that is tied to a particular individual. In this manner, any adding, accessing, or modification of content that is made using a BKEY for authentication is linked to the specific individual to which that BKEY is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1 or better) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combine in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of BKEY clearance or classification is required to make specific changes.

Figure 4:
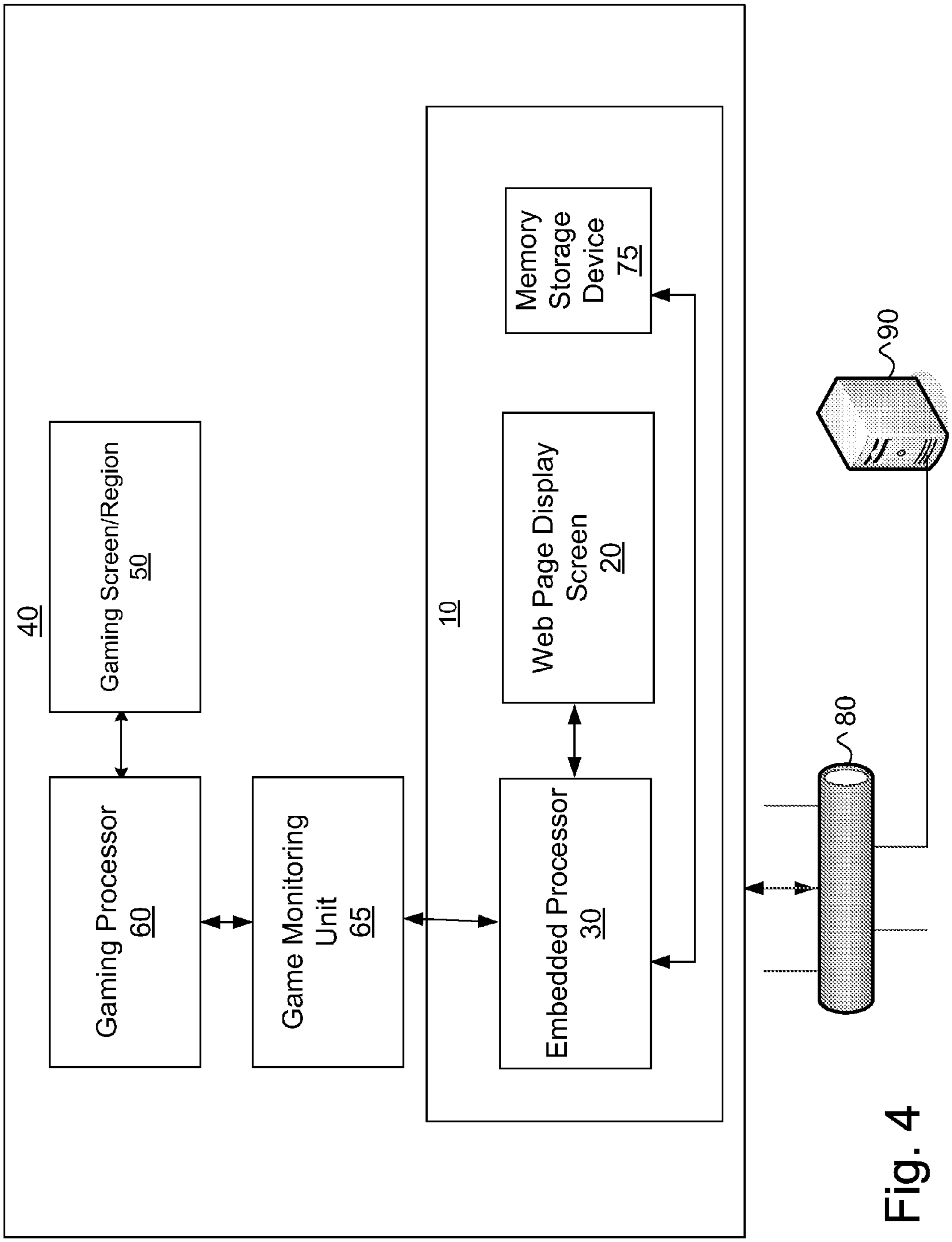
FIG. 4 illustrates a relational diagram of embedded additional user interface, constructed in accordance with the claimed invention, utilizing a web page display screen and an embedded processor that receives web page content from a back-end server via an Ethernet-networked backbone.

Referring now to FIG. 4, in one preferred embodiment, the embedded additional user interface 10 connects to an Ethernet-networked backbone 80 instead of a local system network. Currently, casino networks are not Ethernet, but rather are smaller, more simplistic local system networks. Thus, in this Ethernet-networked backbone 80 embodiment, the current system network is replaced by an industry standard Ethernet backbone, such as 10/100 base T Ethernet running over Cat 3, 4, 5, 6, or higher. Thus, a standard 10/100 base T Ethernet card is added to the embedded processor 30 in this embodiment. Preferably, the network employs TCP/IP, HTTP, and XML messaging or a variant of XML. Nevertheless any suitable protocol may be used.

Further, in another preferred embodiment, the embedded additional user interface 10 connects to a full featured, back end, download configuration server 90 through the above-described Ethernet-networked backbone 80 as shown in FIG. 4. In such an embodiment, the full-featured server 90 can schedule downloads of content (gaming or otherwise) as well as upload information from the gaming machines 40, such as what options the gaming machines 40 currently possess. Accordingly, in a preferred embodiment, the primary use of the server 90 is as data download and data retrieval server. While this server 90 does upload and download web content style information, it is typically not connected to the World Wide Web. This server 90 must be authenticated (just like a gaming machine) to make the content served to the embedded additional user interface 10 acceptable to the gaming regulators. Preferably, utilization of the Ethernet-networked backbone 80 and the server 90 provides many system benefits, including but not limited to reliability, maintainability, security, content staging, content testing, deployment procedures, and incident recovery. In one embodiment, deliverables also preferably include content templates and guidelines for casino owners and operators to create their own web content for deployment to the web server. In one embodiment, the web server 90 has its content authenticated in the same manner as the embedded additional user interface 10 to allow content to be downloaded to the web page display screen 20.

Figure 5:
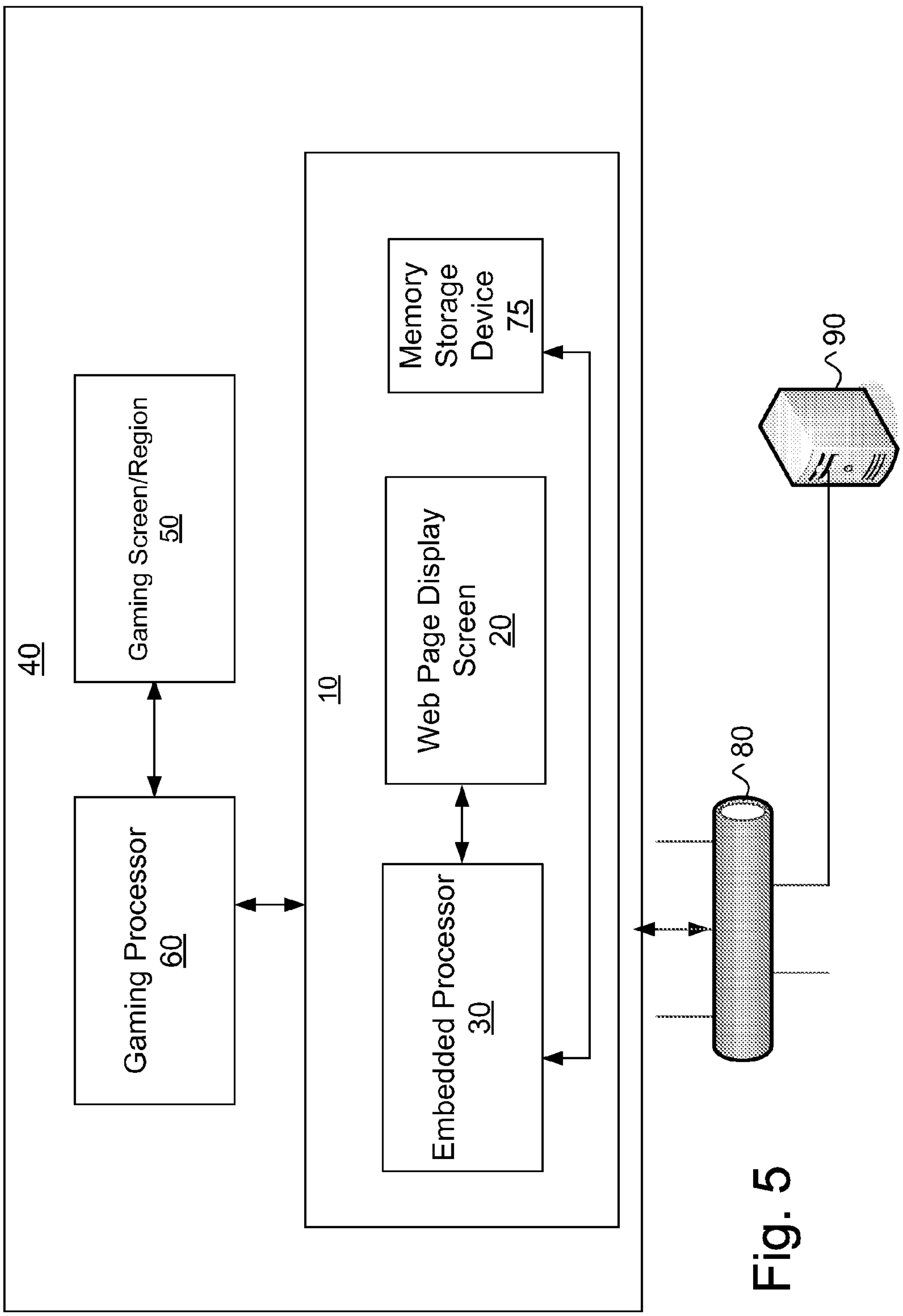
FIG. 5 illustrates a relational diagram of embedded additional user interface, constructed in accordance with the claimed invention, utilizing a web page display screen and an embedded processor that includes the functionality of a standard gaming processor.

Referring now to FIG. 5, in another preferred embodiment of the claimed invention, the functions previously performed by the gaming monitoring unit 65, as shown in FIGS. 1-4, of the gaming machine 40 are supported by the embedded processor 30 of the embedded additional user interface 10. Otherwise stated, the GMU code is transitioned from the gaming monitoring unit 65 into the embedded processor 30 in the embedded additional user interface 10. Accordingly, such a configuration removes the need for the gaming monitoring unit 65 in the gaming machine 40. This results in a significant reduction in the amount and complexity of the hardware, as well as completing a phased transition of more traditional style gaming machines into more modernized upgraded gaming machines.

Thus, in such a preferred embodiment, the claimed invention is directed towards an embedded additional user interface 10 that is incorporated into a gaming machine 30, the gaming machine in turn including a gaming screen 50 or other appropriate gaming region (e.g., spinning reels), but does not include a gaming monitoring unit 65. Such an embedded additional user interface 10 still includes a web content capable display screen 20 and an embedded processor 30. Once again, the web content capable display screen 20 presents web information to a user via the display screen. The embedded processor 30 preferably utilizes an internal operating system. Furthermore, in this embodiment the embedded processor 30 additionally includes standard gaming monitoring unit functionality (GMU code), since it replaces the gaming monitoring unit 65 in the gaming machine 40. As before, the embedded processor 30 reads incoming data, translates the data into a web protocol (web authoring language), if necessary, and maps the data to the web content capable display screen 20.

In one embodiment, the embedded additional user interface 10, the messages are flashed (e.g., animation, multimedia, and the like) to the player within the web page display screen 20 while the gaming screen 50 is used for game play. These web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI would only been capable of scrolling this message in one-quarter inch (0.25") tall monochrome text, in contrast, the web page display screen 20 would "flash" this message in bright red, white, black, and green animated format, on six inch (6.0") by three inch (3.0") color graphic display. Additionally, in some embodiments, inserting a player identification card into a card reader and/or selecting a player services button activates additional player services functionality.

In one exemplary embodiment of the embedded additional user interface 10 that utilizes a card reader (or other identification technique, such as a player ID code) to recognize a particular player, the web page display screen 20 displays an eye-catching, web page-style message to that player, for example, "Welcome, Mr. Smith!" in response to identifying Mr. Smith. Preferably, the web page display screen 20 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the web page display screen 20 for the player.

For example, in one embodiment, when the "Transactions" touch screen icon button is selected, a new screen is activated that includes the web page style message, "Mr. Smith, Account Balance Bonus Points=1200, Player Funds=$150, Available Credit=$850, Casino Matching Funds Available=$25," as well as the "Return to Game" icon button 120. As a further example, when the player selects a "Cashless Withdraw" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the web page display screen 20 that provides answers to frequently asked questions and other useful information. Moreover, the web page display screen 20 preferably also includes a "History" button that, when selected, launches a new screen within the web page display screen 20 that provides a history log of all transactions and other actions performed on that gaming machine 40.

In accordance with another preferred embodiment, the claimed invention is directed towards a method for increasing user excitement relating to a gaming machine by providing a richer gaming experience via an embedded additional user interface that is incorporated into the gaming machine. The method preferably includes: receiving a serial data message (e.g., an $I^2C$ data message) containing enhanced player information over a serial communication bus (e.g., an $I^2C$) bus in the embedded additional user interface 10; translating the data message (using the embedded processor 30) into a web authoring language; and mapping the data message to the web page display screen 20, wherein the display screen presents web page information to a user via the display screen.

The potential advantages of utilizing the embedded additional user interface 10 of the claimed invention are numerous. These potential advantages include, by way of example only, and not by way of limitation: providing animated and/or multimedia web style content; providing fonts and icons which are larger and more aesthetically appealing; providing special services to players, (e.g., multiple languages, assistance for handicapped individuals); facilitating interactive uses of the web page display screen 20; providing the ability to customize the "look and feel" of the web page display screen 20 for players and casino employees; increased player excitement and participation; and simplified replaceability and/or upgradeability from an EPI or other similar non-web page style components.

In one embodiment, the embedded additional user interface 10, which operates as a user interface (UI) or terminal, includes a video display that is equipped with a touch screen and audio device. In this embodiment, the embedded additional user interface 10 provides the gaming machine with the capability of executing applications from one or more web servers, as well as enabling the execution of the gaming machine's local applications, simultaneously. For example, in one embodiment, the gaming machine contains an interactive local player tracking and game management system unit, but also executes a back-end casino management application located on a back-end server. Further, in one embodiment, the UI comprises a touch controlled web-browser that renders information from the local gaming machine and interconnected web servers, thereby providing the user with (1) game data, (2) local player session data, and (3) back-end casino management data in a single interface. For example, in one embodiment, each of these types of data includes coin-in derivative data for the player: the coin-in derivatives for the game, the coin-in derivatives for the player session, and the coin-in derivative for that player for one or more casinos. The coin-in and bonus status based on the coin-in for each of these types of data can be displayed, each in different screen regions, or in the same screen region, if desired.

In one embodiment, the game data includes the output for playing a game, including a game that executes locally within the gaming machine, or a network game, such as a progressive game or peer-to-peer game. The local session data includes data related to a player's use of the gaming machine from the time the player first began play on the gaming machine. In some cases, the local session data determines whether a player is eligible for bonuses as a result of game play during a session. For example, in one embodiment, the player is given a free play of a hand of electronic poker if 25 hands were played in the last hour. In another embodiment, a bonus game is associated with a player's play on a gaming machine during prior sessions (to attract particular players back to gaming machines they have played).

The back-end casino management data allows global bonusing (or system gaming). In one embodiment, a bonus or system game is awarded based on all prior play by the player within a casino or all play within several casinos. Whether based on (1) game data, (2) local player session data, and/or (3) back-end casino management data, a player's eligibility for a variety of system games may be accessed simultaneously from the single user interface.

In one embodiment, system gaming is based on one or any combination of the following: (1) data collected regarding games played on the local gaming machine 40 by any number of players or all players, (2) back end casino management data collected regarding games played by one player anywhere in the casino; and/or (3) back-end casino management data collected regarding games played by several players or all players in a casino, or two or more casinos. For example, with regard to game play on the local gaming machine in one embodiment, a bonus is triggered after a threshold coin-in on the gaming machine 40 is met, whether the coin-in amount is from one player or several players who have played games on the gaming machine 40. In another embodiment, back-end casino data is collected through the network from many gaming machines played by a player. The data includes coin-in data to compare against a threshold to determine whether one or more bonuses should be awarded to the player, who is identified using a player ID card that is swiped or inserted into the gaming machine during game play.

In another embodiment, back-end casino data collected through the network from many gaming machines includes coin-in data to compare against a threshold to determine whether one or more bonuses should be awarded at one or more of the gaming machines.

In another embodiment, the game data and/or backend casino data includes yield management data. In one embodiment, the yield management data includes projection data calculated based on one or more factors related to use of one or more gaming machines. For example, in one embodiment, the yield management data includes game play projection data, machine usage projection data, and/or income projection, data calculated based historical game play data for the one or more gaming machines. In one embodiment, the calculations are performed using linear regression analysis. In another embodiment, the calculations are performed using a neural network. In one embodiment, yield management data is used to determine one or more bonuses or the play characteristics of a system game. The embedded user interface 10 facilitates presenting this back end casino or casino management data directly at the gaming machine 40.

Figure 9:
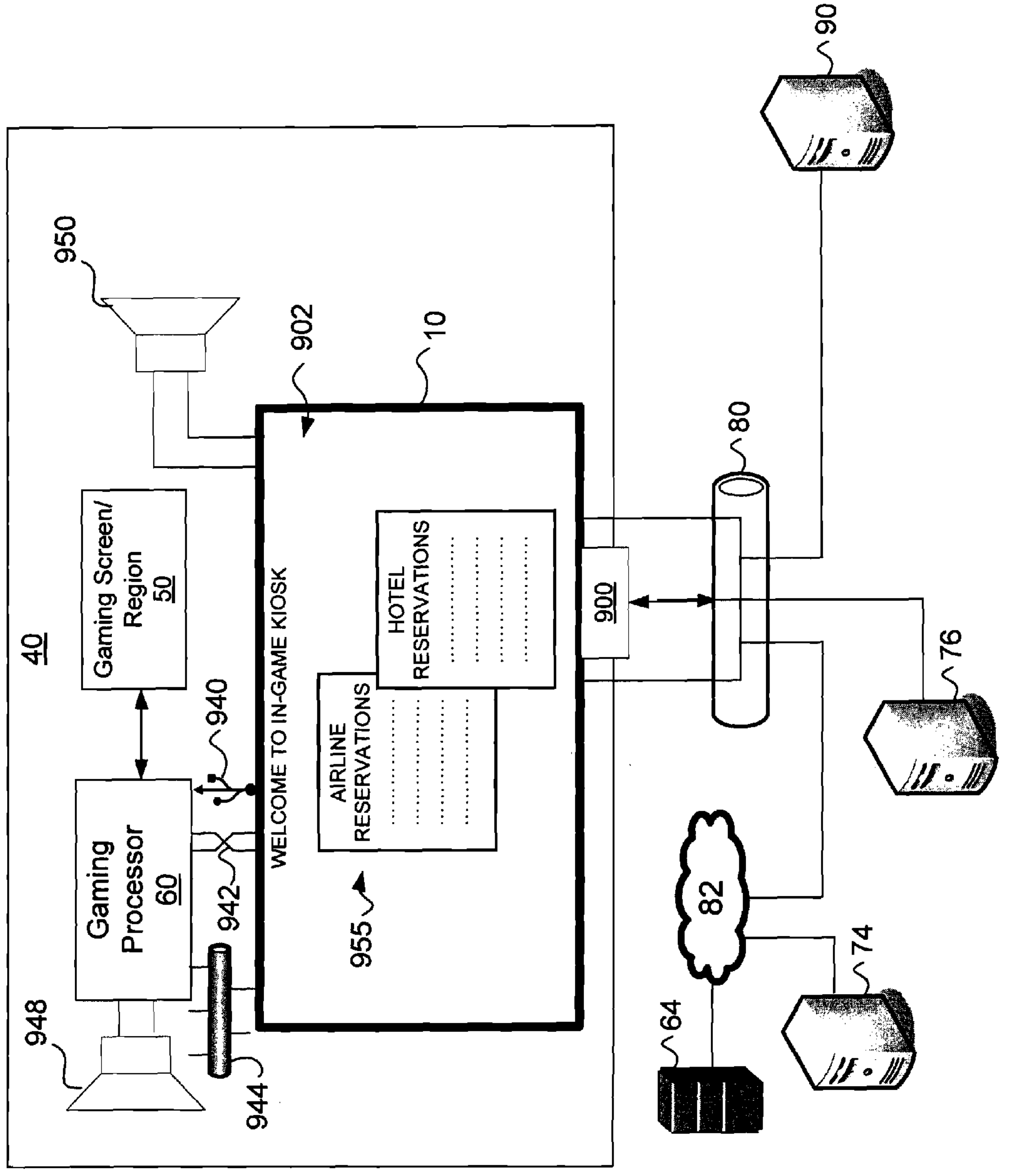
FIG. 9 is a diagram showing an embedded additional user interface that provides a kiosk interface and functionality according to one embodiment.

With reference to FIG. 9, in one embodiment, the UI is within the embedded additional user interface 10 that provides a server client interface with kiosk functionality, and serves as an embedded kiosk 10, by which the embedded additional user interface will be referred to interchangeably herein. Kiosks are traditionally stand-alone machines that provide gaming and non-gaming-related services. Kiosks may include both patron-oriented services and maintenance-oriented features. In one embodiment, patron-oriented services include the ability to sign on to player account enrollment and rewards services, view casino player account standings, view account status and history, redeem payout tickets, redeem promotional or complimentary awards, request help or service from an attendant, order drinks, make dinner reservations, reserve taxis, purchase show tickets, conduct banking transactions, buy lottery tickets, and the like. Maintenance-oriented features include providing information such as coin-in, coin-out, malfunction conditions, jackpots, tilt conditions, game software version, and the like. Other non-gaming related kiosk functions include bank account maintenance, product ordering, coupon redemption, hotel reservations, electronic funds transfers, and the like.

To provide such kiosk functionality, in one embodiment, the embedded kiosk 10 comprises the equivalent of a small personal computer (PC) in tablet form. In one embodiment, the Gateway® M275 Series by Gateway, Inc. of San Diego, Calif., is a notebook PC that is operable as a Tablet PC and can be used to implement the additional embedded user interface 10. A touch screen 902 is included in such a system. In one embodiment, the processor and memory storage device (FIG. 5), and other computer electronics are contained in a thin casing behind the touch screen 902. The touch screen 902 obviates the need for a separate keypad or keyboard, which can be virtualized on the screen 902. In one embodiment, the Windows® XP® operating system available from Microsoft Corporation of Redmond, Wash. operates the embedded kiosk 10. In another embodiment, when a smaller interface is required, a personal digital assistant (PDA), such as the Palm Pilot®, available from Palm Computing, Inc. of Santa Clara, Calif. is used instead of a tablet PC. Such PDAs are also capable of executing one or more versions of the Windows® Operating System, including Windows CE® with a web browser built in.

The embedded kiosk 10 functions are provided from one or more servers 64, 74, 76 90 through the gaming network. Tablet PCs, and now many PDAs such as the Palm Pilot® typically contain, or have available, one or more built-in networking connections 900 to the Ethernet network 80, which may either comprise a hard-wired connection or an 802.11x "wi-fi" or wireless connection. Although other network typologies may be used, the present wide spread availability of Ethernet technology provides an easy networking solution for the system. Security for a "wi-fi" enabled system is provided as discussed below.

Figure 10:
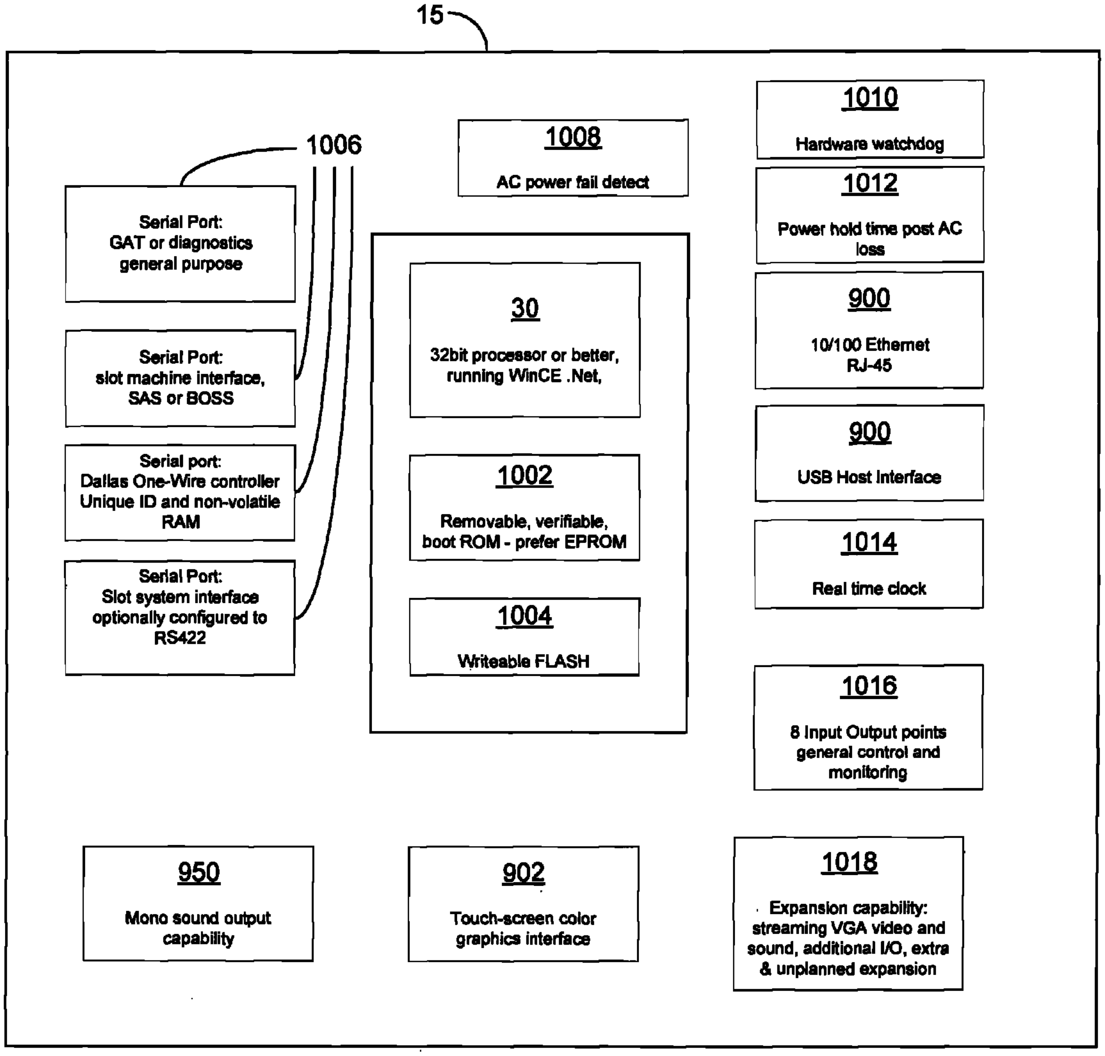
FIG. 10 is a block diagram illustrating components of a kiosk interface computer system board according to one embodiment.

FIG. 10 is a block diagram illustrating components of a computer system board 15 used in one embodiment of the in-game kiosk 10. The embedded processor 30 is a 32 bit processor or better, capable of running .Net compatible Windows CE®. The board uses a removable and verifiable boot ROM, which is preferably an EPROM device 1002. A writable flash 1004 is further included, wherein, for example, boot system verification code can be stored. The touch screen 902 and audio device 950 are represented as described with respect to FIG. 9. In one embodiment, several serial ports 1006 are integrated into the system board to provide electronic access into and out of the kiosk 10 for purposes such as, but not limited to, diagnostics, access using switched access service (SAS) or business operations Support System (BOSS) interfaces, access for a one-wire controller/non-volatile RAM device, or slot machine access via a RS422 interface. An AC power fail/detect device 1008 is used either as part of a PC power supply, or separate from the power supply, so that the chance of damage to the kiosk is lessoned if a power-out condition occurs. A hardware watchdog 1010 monitors system hardware to ensure that the system is in proper running condition during operation of the kiosk 10. A power-hold-time-post-AC-loss device 1012 is used to maintain power for a period of time after a power loss to run data and hardware protection processes. In the embodiment of FIG. 10, the Ethernet connection 900 is built into the system board with a RJ-45 connector. The USB interface 940 is integrated with the system board for the host connection to the gaming processor 60. A real-time clock 1014 is used with the system board. Output ports 1016 are further integrated with the system board 15 for control and monitoring of the kiosk. Finally, one embodiment of the system board 15 has a media expansion slot 1018 to allow connection of enhanced audio devices, video devices, data ports, network ports, and the like.

With reference back to FIG. 9, in one embodiment, the Ethernet network 80 comprises a peer-to-peer network connecting multiple devices. Off the shelf networking equipment may be used for the network 80, such as the Netgear® Double 108 Mbps Firewall Router, Model WGU624, available from Netgear, Inc. of Santa Clara, Calif. Such networking systems typically provide plug-in-play (PnP) installation for the current Windows® series of operating system versions. The peer-to-peer type network allows a network to forward information from one machine to another, without the need for a connection at one central location to distribute data in the network.

While Ethernet technology began as a collision-detection bus network in most modern Ethernet platforms, a concentrator is used in a star-type network structure with physical lines to each node on the network. Nevertheless, peer-to-peer networking is still practiced in Ethernet networks, wherein one node forwards or sends data to another node, which can send the data to yet another node. In this fashion, updates may be perpetuated through the network without using a central server to arbitrate the transfer. The Microsoft Windows Network® is an example of a peer-to-peer network that can use Ethernet technology for the physical network. True physical peer-to-peer networks that can also be used with the invention include token-ring and the peer-to-peer networking built into currently sold PC systems by the Apple Computer Corporation. Nevertheless, whether the physical network layer is true peer-to-peer, the operating system layer and application layer may send and receive data in true peer-to-peer fashion over the network from one node to another, without regard to whether a central server is involved or not.

In one embodiment, the Internet connection 900 comprises an add-on or built-in Ethernet port in the back of the embedded additional user interface 10. In another embodiment, the Internet connection 900 comprises a wi-fi connection built directly into the embedded additional user interface 10 using, for example, Intel® Centrino® technology. Current wi-fi security systems, such as Wired Equivalent Privacy (WEP) or Wi-Fi Protected Access (WPA) security, may be used to secure the wireless connection. In another embodiment, wireless technology is not used by the embedded additional user interface 10 of the claimed invention.

Preferably, an audio device 950 is included with the embedded additional user interface 10. In one embodiment, the audio device 950 comprises an upgraded sound system, such as a stereo set of PC compatible speakers linked to a sound card in the tablet PC-type of embedded additional user interface 10. The audio device 950 is used as a secondary sound system that projects audio signals provided only by the embedded additional user interface 10 with the underlying gaming machine 40 having a separate sound system 948. However, in one embodiment, the audio signals produced by the underlying gaming machine 40 and the embedded additional user interface 10 are combined by the embedded additional user interface 10 for presentation by the audio device 950. In another embodiment, the embedded additional user interface 10 provides its audio signals back to the underlying gaming machine 40 for presentation by the native sound system 948. In other embodiments, additional user interface devices are included, for example, and not by way of limitation, cameras and biometric sensors that can be used for user identification in kiosk functions that require use of these interface devices for security.

In another embodiment, only one audio device, 948 or 950, is used. An audio switch is used to present audio signals from the gaming processor 60 and kiosk 10. In one embodiment, the audio switch is a transistor switch that serially presents the signals from the gaming machine and the kiosk without mixing the audio signals.

Bi-directional communication between the gamming processor 60 of the underlying gaming machine 40 and the kiosk 10 is accomplished using a variety of methods, including, but not limited to, using a USB connection or hub 940. In another embodiment, communication between the host gaming processor 60 and the kiosk 10 is provided through an Ethernet connection 944. For older gaming machines that may not support USB technology, an RS232, or parallel connection 942 with a null modem crossover send/receive wire may be used for bidirectional communications.

In one embodiment, the kiosk related functions are provided from one or several network devices, such as servers 90, 76, 74, that are connected to the network 80 with one or more of the servers 74 having a connection through a wide area network 82. For example, and not by way of limitation, one or more of the network servers 90 includes a lottery server that is operated by state lottery officials. The lottery server, for example, provides the same data communication to the embedded kiosk 10 that is provided to standard lottery kiosks found, for example, in grocery stores and the like. Another server 76 comprises, for example, and not by way of limitation, an airline reservation server for selling airline tickets as found in some airports. The same data communication is provided to the embedded kiosk 10 as is provided to airport kiosks. In this regard, the imbedded kiosk 10 serves as mutlifunction kiosk connected to one or more servers serving kiosk functions to the imbedded kiosk 10. In one embodiment, users are presented with a menu of choices on the touch screen 902 for which of the kiosk functions are desired.

In some embodiments, the wide area network 82 comprises the Internet with the server 74 connected to the network 80 through one or more secure virtual private networks (VPN) pipes. Thus, the embedded kiosk 10 and game machine 40 have access to the VPN servers 74 and also other non-secure devices, such as Internet web servers 64 serving game, and/or kiosk functions.

In one embodiment, the execution in each kiosk function can occur in a separate browser window 955 simultaneously with other kiosk functions. Each kiosk function is implemented as a separate execution of a browser program or instance 955 of a browser program, such as the Microsoft® Internet Explorer®, or the Netscape® browser. Each of these browser applications provide the capability of executing HTML, XML, Java®, and other browser-compatible kiosk functions within an autonomous browser instance 955, while allowing, if desired, interaction between the browser instances 955. For example, kiosk data for one browser window 955 for hotel reservations can be integrated with kiosk data for another browser window 955 for flight reservations to automatically fill in travel and hotel stay dates, and the like.

Referring, for example, to Internet Explorer® for the purpose of explanation when an HTML web page, or other browser displayable data is received, an intermediate receptor provides the data stream to a connection management system to provide the data to the proper application window. A well-known example of such a system is the Winsock system in the Windows® environment.

Using Winsock, when a client, such as the kiosk 10 in the embodiment of FIG. 9 accesses a server, it opens a connection to the server using the TCP/IP protocol. A first step in opening this communication requires the central processing unit to open a socket. The sockets system (also called Berkeley sockets) is part of the Winsock protocol, which is an application programming interface (API) commonly used to access the Internet. Generally, to open a socket, three steps are taken. A socket is first allocated. Next, a socket is "bound" to a local address that identifies the client and client window executing the relevant application. The socket is then associated with the IP address of the host, which may be a remote server 74, 76, 90, 64, or local host (e.g., gaming machine 40). Data is received and sent (receive and send calls) between the client and host as needed according to HTTP, FTP, or whatever communication protocol is required to download the page.

Several sockets can be opened at the same time. For example, each instance of a browser kiosk window running a kiosk operation, opens a socket to exchange information with a server 74, 76, 90, 64. Each socket opened by each kiosk function is able to thus connect to a separate entity or device connected to the network. The Windows® operating environment and other operating systems that can be used, such as Linux® or XWindows, allow for application windows, including instances of browsers to be tiled or over overlapped. Thus, in one embodiment, each kiosk operation comprises either a browser or non-browser application window executing a local, secure network, or web, application, executing simultaneously.

In another embodiment, each browser instance 955 is located in a dedicated or non-dedicated screen region on screen 902 as described in application Ser. No. 11/140,239, entitled "User Interface System And Method For A Gaming Machine," filed on May 26, 2005 (the '239 Application). That application describes an embedded user interface with separate screen regions, wherein each screen region is implemented as a separate execution of a browser program or instance of a browser program. In this embodiment, the screen 902 is divided into screen regions as described in the '239 Application, with the content of each screen region being controlled by one or more kiosk servers as described above with each browser window 955.

In one embodiment, the kiosk device 10 is capable of being attached to any other device or physical mounting area, such as a bar top, wall, desk (e.g., in a hotel room), vending machine, and the like. In another embodiment, the kiosk device 10 is mounted to a traditional stand-alone kiosk cabinet to replace or enhance the functionality of the stand-alone kiosk. For example, and not by way of limitation, a kiosk that is normally used for hotel reservations or other functions can be enhanced by attaching the kiosk device 10 as an embedded additional user interface for the stand-alone kiosk to add the ability to purchase airline tickets and the like. Still another embodiment for the bar-top mounting can be used, for example, and not by way of limitation, for ordering drink re-fills or food from the kitchen, while providing the ability to transfer funds into a casino account from a player's bank account.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming machine including a cabinet, a gaming presentation, a gaming processor, and an embedded user interface configured as a kiosk, the embedded user interface comprising:

a source of incoming kiosk text data messages for a user;

a web content capable display screen, wherein the display screen presents web information to a user, and wherein the web content capable display screen is separate from the gaming presentation of the gaming machine;

a dictionary component, coupled to the message source, wherein the dictionary component translates an incoming kiosk text data message for the user into a kiosk web content message for the user by looking up the kiosk text data message in a dictionary data file which provides a mapping of possible kiosk text data messages to corresponding kiosk web content messages; and an embedded processor that employs an internal operating system and communicates with the gaming processor, wherein the embedded processor reads an incoming kiosk text data message for the user from one or more kiosk servers connected to a gaming network, provides the incoming kiosk text data message to the dictionary component, retrieves the kiosk web content message corresponding to the incoming kiosk text data message from the dictionary component, and displays the corresponding web content message to the user on the web content capable display screen;

whereby the web content capable display provides kiosk operations in addition to a gaming experience by displaying the corresponding kiosk web content message to the user rather than displaying the incoming kiosk text data message to the user.

2. The embedded user interface of claim 1, wherein the kiosk operations are of the type selected from the group consisting of: using player account enrollment and rewards services, viewing of casino player account standings, viewing of account status and history, redeeming of payout tickets, redeeming of promotional or complimentary awards, requesting help or service from an attendant, ordering drinks, making dinner reservations, reserving taxis, purchasing show tickets, conducting banking transactions, buying lottery tickets, providing coining and coin-out information, displaying malfunction conditions, displaying jackpots, displaying tilt conditions, displaying a game software version, conducting bank account maintenance, ordering products, redeeming coupons, making hotel reservations, and conducting electronic funds transfers.

3. The embedded user interface of claim 1, wherein the embedded processor further sends an reply kiosk text data message received from a user to the one or more kiosk data servers.

4. The embedded user interface of claim 1, wherein the multimedia web content capable display screen is a color graphic touch screen display.

5. The embedded user interface of claim 1, wherein the internal operating system is customized to match the specific hardware to which the internal operating system attaches.

6. The embedded user interface of claim 1, wherein the embedded processor utilizes cryptographic technology.

7. The embedded user interface of claim 1, wherein the incoming kiosk data text message is processed by a certification process for authentication and non-repudiation.

8. The embedded user interface of claim 7, wherein the certification process provides auditability and traceability.

9. The embedded user interface of claim 8, wherein the certification process provides sufficient security for gaming regulators to allow operators to design their own content.

10. The embedded user interface of claim 1, wherein the web authoring protocol is HTML.

11. The embedded user interface of claim 9, wherein the web authoring protocol is DHTML.

12. The embedded user interface of claim 9, wherein the web authoring protocol is XML.

13. The embedded user interface of claim 1, wherein the gaming network includes an Ethernet-networked backbone.

14. The embedded user interface of claim 1, wherein the gaming network connects to a wide area network for connection to the one or more kiosk data servers.

15. A gaming machine including a gaming presentation, a gaming processor, and an embedded user interface for use as a kiosk, the embedded user interface comprising:

a source of incoming kiosk text data messages for a user;

a multimedia display screen, wherein the display screen presents web page information to a user, and wherein the multimedia display screen is separate from the gaming presentation of the gaming machine;

a dictionary component, coupled to the message source, wherein the dictionary component translates an incoming kiosk text data message for the user into a kiosk web content message for the user by looking up the kiosk text data message in a dictionary data file which provides a mapping of possible kiosk text data messages to corresponding kiosk web content messages; and an additional processor that reads an incoming kiosk text data message for the user from one or more kiosk servers through a gaming network, provides the incoming kiosk text data message to the dictionary component, retrieves the kiosk web content message corresponding to the incoming kiosk text data message from the dictionary component, and displays the corresponding kiosk web content message to the user on the multimedia display screen;

whereby the multimedia display screen provides kiosk operations in addition to a gaming experience by displaying the corresponding kiosk web content message to the user rather than displaying the incoming kiosk text data message to the user.

16. The method of claim 15, wherein the kiosk operations are of the type selected from the group consisting of: using player account enrollment and rewards services, viewing of casino player account standings, viewing of account status and history, redeeming of payout tickets, redeeming of promotional or complimentary awards, requesting help or service from an attendant, ordering drinks, making dinner reservations, reserving taxis, purchasing show tickets, conducting banking transactions, buying lottery tickets, providing coin-in and coin-out information, displaying malfunction conditions, displaying jackpots, displaying tilt conditions, displaying a game software version, conducting bank account maintenance, ordering products, redeeming coupons, making hotel reservations, and conducting electronic funds transfers.

17. The embedded user interface of claim 15, wherein the kiosk text data message includes game-related data.

18. The embedded user interface of claim 15, wherein the kiosk text data message includes non-game related data.

19. The embedded user interface of claim 15, wherein the kiosk text data message includes electronic funds transfer data.

20. The embedded user interface of claim 15, wherein the kiosk text data message includes casino player account standings data.

21. The embedded user interface of claim 15, wherein the kiosk text data message includes casino promotional awards data.

22. The embedded user interface of claim 15, wherein the kiosk text data message includes casino service request data.

23. The embedded user interface of claim 15, wherein the kiosk text data message includes player account enrollment data.

24. The embedded user interface of claim 15, wherein the kiosk text data message includes casino ticket redemption data.

25. The embedded user interface of claim 15, wherein the kiosk text data message includes complimentary award data.

26. The embedded user interface of claim 15, wherein the gaming network includes a peer-to-peer network.

27. The embedded user interface of claim 15, further including a biometric sensor to provide user authentication.

28. The embedded user interface of claim 15, further including a camera to provide images for the kiosk operations.

29. A method for providing kiosk operations for a gaming machine that includes a gaming presentation, a gaming processor, and an embedded user interface that is incorporated into a cabinet of the gaming machine, wherein the embedded user interface includes an embedded processor and a web page display screen, the method comprising:

receiving a kiosk text data message containing kiosk text data through a communication bus in the embedded user interface;

translating the kiosk text data message for the user into a kiosk web content message for the user by looking up the text data message in a dictionary data file which provides a mapping of possible kiosk text data messages to corresponding kiosk web content messages; and displaying the corresponding kiosk web content messages to the user on the web page display screen.

30. A gaming machine including a gaming presentation, a gaming processor, and an embedded user interface having kiosk functionality, the gaming machine comprising:

a gaming machine cabinet;

an embedded user interface configured as a kiosk incorporated into the gaming machine cabinet of the gaming machine;

a network connection capable of sending and receiving kiosk text data messages to and from one or more kiosk servers via the gaming network;

a dictionary component, coupled to the network connection, wherein the dictionary component translates an incoming kiosk text data message for the user into a kiosk web content message for the user by looking up the kiosk text data message in a dictionary data file which provides a mapping of possible kiosk text data messages to corresponding kiosk web content messages;

a display incorporated into the embedded user interface, the display presenting kiosk web data messages corresponding to kiosk text data messages received from the one or more kiosk data servers through a gaming network, wherein the display is separate from the gaming presentation of the gaming machine; and a processor incorporated into the embedded user interface that executes an internal operating system of the embedded user interface and communicates with the gaming processor, wherein the embedded processor reads an incoming kiosk text data message for the user from one or more kiosk servers connected to a gaming network, provides the incoming kiosk text data message to the dictionary component, retrieves the kiosk web content message corresponding to the incoming kiosk text data message from the dictionary component, and displays the corresponding web content message to the user on the display.

* * * * *